(12) United States Patent
Li et al.

(10) Patent No.: US 12,711,313 B2
(45) Date of Patent: Aug. 18, 2026

(54) HUMAN-MACHINE COLLABORATIVE CONVERSATION INTERACTION SYSTEM AND METHOD

(71) Applicant: Alibaba Damo (Hangzhou) Technology Co., Ltd., Hangzhou (CN)

(72) Inventors: Yongbin Li, Beijing (CN); Che Liu, Beijing (CN); Rui Wang, Beijing (CN); Jian Sun, Beijing (CN)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 503 days.

(21) Appl. No.: 18/323,717

(22) Filed: May 25, 2023

(65) Prior Publication Data

US 2023/0394247 A1 Dec. 7, 2023

(30) Foreign Application Priority Data

Jun. 1, 2022 (CN) ......................... 202210616442.3

(51) Int. Cl.
*G06F 40/35* (2020.01)
*G06F 40/284* (2020.01)
*G06F 40/40* (2020.01)

(52) U.S. Cl.
CPC ............ *G06F 40/35* (2020.01); *G06F 40/284* (2020.01); *G06F 40/40* (2020.01)

(58) Field of Classification Search
CPC ........ G06F 40/35; G06F 40/284; G06F 40/40; G06F 40/211; G06F 40/289; G06N 20/00
See application file for complete search history.

(56) References Cited

U.S. PATENT DOCUMENTS

| | | | | |
|---|---|---|---|---|
| 11,568,145 B1 * | 1/2023 | Romeo | .................. | G06F 40/30 |
| 2018/0261203 A1 | 9/2018 | Zoller et al. | | |
| 2022/0139384 A1 * | 5/2022 | Wu | ........................ | G06F 40/35 704/257 |

FOREIGN PATENT DOCUMENTS

| | | |
|---|---|---|
| CN | 108228764 A | 6/2018 |
| CN | 110196897 A | 9/2019 |

(Continued)

OTHER PUBLICATIONS

Devlin et al. "BERT-Pre-training of Deep Bidirectional Transformers for Language Understanding" Proceedings of NAACL-HLT 2019, pp. 4171-4186 (Year: 2019).*

(Continued)

*Primary Examiner* — Daniel C Washburn
*Assistant Examiner* — Penny L Caudle
(74) *Attorney, Agent, or Firm* — Finnegan, Henderson, Farabow, Garrett & Dunner, LLP

(57) ABSTRACT

A system for human-machine collaborative conversation interaction includes one or more processors configured to execute instructions to cause the system to perform operations including: outputting, according to conversation data to be processed, structural information of the conversation data, wherein the conversation data comprises multiple turns of conversation; obtaining, according to the structural information, a semantic representation vector carrying phrase-dimensional semantic information, sentence-dimensional semantic information and topic-dimensional semantic information corresponding to the conversation data; obtaining semantic transfer relationships between each turn of conversation according to the semantic representation vector; and determining, according to the semantic representation vector and the semantic transfer relationships, conversation data matching service requirements so as to perform preset (Continued)

service processing through the determined conversation data.

17 Claims, 4 Drawing Sheets

(56) References Cited

FOREIGN PATENT DOCUMENTS

| | | | |
|---|---|---|---|
| CN | 111625641 | A | 9/2020 |
| CN | 112468659 | A | 3/2021 |
| CN | 112988985 | A | 6/2021 |
| CN | 114357973 | A | 4/2022 |
| TW | 202133027 | | 9/2021 |

OTHER PUBLICATIONS

First Search Report issued in corresponding Chinese Application No. 202210616442.3 on Jul. 19, 2022 (2 pages).
Supplementary Search Report issued in corresponding Chinese Application No. 202210616442.3 on Aug. 16, 2022 (1 page).
Supplementary Search Report issued in corresponding Chinese Application No. 202210616442.3 on Sep. 5, 2022 (1 page).

* cited by examiner

HUMAN-MACHINE COLLABORATIVE CONVERSATION INTERACTION SYSTEM AND METHOD

CROSS-REFERENCE TO RELATED APPLICATIONS

The present application claims priority to and the benefits of Chinese Patent Application Serial No. 202210616442.3, filed on Jun. 1, 2022, which is incorporated herein by reference in its entirety.

TECHNICAL FIELD

Embodiments of the present disclosure relate to artificial intelligence and, in particular, to a human-machine collaborative conversation interaction system and method.

BACKGROUND

Human-machine collaborative conversation interaction is a technology in which a machine learns knowledge from conversations between customers and human customer service agents and assists and guides the human customer service agents to complete incoming tasks. In recent years, intelligent conversation bots based on this technology have become more and more commonly applied in various service industries. However, due to limitations by advances in the current human-machine collaborative conversation interaction technology and the complexity of practical application scenarios, intelligent conversation bots can only replace part of the work of service personnel. In the customer service industry, for example, human customer service agents face several key problems: (1) low service efficiency and large differences in levels: due to the professionalism and complexity of customer service work, human customer service agents cannot master all the service knowledge, and thus in the service process, it is often necessary to query the knowledge base and historical cases for specific service problems, which affects service efficiency and also reduces customer service satisfaction; (2) similarly, due to the professionalism and complexity of customer service work, the service level provided by junior and senior customer service agents differs greatly, and junior customer service agents often have difficulty fully grasping the standard service process and scripts, which further affects service quality; and (3) the long training period: due to the need to learn complicated service knowledge, human customer service agents require extensive training before starting their job, and the cost of agent training is high.

Similarly, other service industries also face issues where intelligent conversation bots do not fully meet the service requirements. Therefore, building a more intelligent human-machine collaborative conversation interaction system to meet various collaborative conversation interaction needs in the actual working scenarios for intelligent conversation bots has become an urgent problem to be solved.

SUMMARY

Embodiments of the present disclosure provide a system for human-machine collaborative conversation interaction. The system includes one or more processors configured to execute instructions to cause the system to perform operations including: outputting, according to conversation data to be processed, structural information of the conversation data, wherein the conversation data includes multiple turns of conversation; obtaining, according to the structural information, a semantic representation vector carrying phrase-dimensional semantic information, sentence-dimensional semantic information and topic-dimensional semantic information corresponding to the conversation data; obtaining semantic transfer relationships between each turn of conversation according to the semantic representation vector; and determining, according to the semantic representation vector and the semantic transfer relationships, conversation data matching service requirements so as to perform preset service processing through the determined conversation data.

Embodiments of the present disclosure provide a method for human-machine collaborative conversation interaction applied to a human-machine collaborative conversation interaction system. The method includes: receiving conversation data to be processed, wherein the conversation data includes multiple turns of conversation; obtaining structural information of the conversation data; according to the structural information, obtaining a semantic representation vector carrying phrase-dimensional semantic information, sentence-dimensional semantic information and topic-dimensional semantic information corresponding to the conversation data; according to the semantic representation vector, obtaining semantic transfer relationships between each turn of conversation; and according to the semantic representation vector and the semantic transfer relationships, determining conversation data matching service requirements so as to perform preset service processing through the determined conversation data.

Embodiments of the present disclosure provide a non-transitory computer-readable storage medium. The non-transitory computer-readable storage medium stores a set of instructions that are executable by one or more processors of a device to cause the device to perform: receiving conversation data to be processed, wherein the conversation data includes multiple turns of conversation; obtaining structural information of the conversation data; according to the structural information, obtaining a semantic representation vector carrying phrase-dimensional semantic information, sentence-dimensional semantic information and topic-dimensional semantic information corresponding to the conversation data; according to the semantic representation vector, obtaining semantic transfer relationships between each turn of conversation; and according to the semantic representation vector and the semantic transfer relationships, determining conversation data matching service requirements so as to perform preset service processing through the determined conversation data.

It should be understood that the above general descriptions and the following detailed descriptions are merely for exemplary and explanatory purposes, and do not limit the present disclosure.

BRIEF DESCRIPTION OF THE DRAWINGS

In order to more clearly illustrate the technical solutions in the embodiments of the present disclosure or in the prior art, a brief description of the drawings required in the description of the embodiments or the prior art will be given below, and it is obvious that the drawings in the description below are some embodiments recorded in the embodiments of the present disclosure, and that other drawings can be obtained from these drawings by those of ordinary skill in the art.

DETAILED DESCRIPTION

Figure 1:
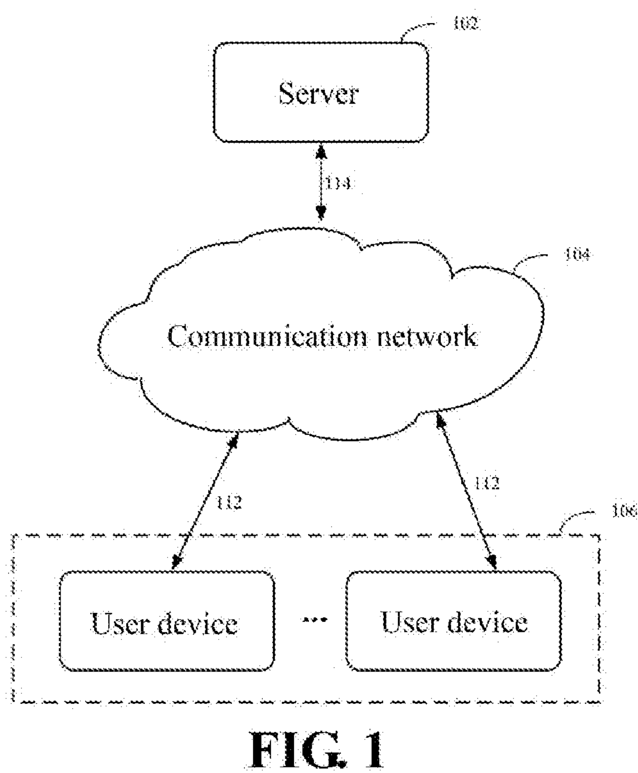
FIG. 1 is a schematic diagram of an example system applicable to a human-machine collaborative conversation interaction solution according to some embodiments of the present disclosure.

In order to enable those in the art to better understand the technical solutions in the embodiments of the present disclosure, the technical solutions in the embodiments of the present disclosure will be clearly and completely described below in conjunction with the accompanying drawings of the embodiments of the present disclosure. It is clear that the described embodiments are only part of the embodiments of the present disclosure, and not all of the embodiments. Based on embodiments of the present disclosure, all other embodiments obtained by those of ordinary skill in the art shall fall within the scope of protection of the embodiments of the present disclosure.

Specific implementations of the embodiments of the present disclosure are further described below in connection with the accompanying drawings of the embodiments of the present disclosure.

According to the solution provided in the embodiments of the present disclosure, a system for human-machine collaborative conversation interaction is used to meet different service requirements. Through the conversational pre-training layer, the structural information of the conversation data can be obtained. The structural information can effectively characterize the syntactic structural relationships within the statements corresponding to the conversation data and the syntactic dependencies among multiple statements. Accordingly, an accurate basis can be provided for more accurate understanding of the semantics of the conversation data in the future. Through the conversation representation learning layer, the semantic representation vectors of the conversation data in several different dimensions can be obtained. The semantic representation vectors in different dimensions are complementary and cross-referential to each other, thus further ensuring the comprehensiveness and correctness of the semantic understanding of the conversation data. The conversation structure learning layer can analyze the semantics of the conversation mainly from the perspective of conversation turns so as to obtain the semantic transfer relationships between different turns of conversation. Accordingly, each conversation statement can take other statements as semantic reference and, particularly in the presence of pronouns, ellipses, etc., more accurate semantic information can be obtained. The service layer, based on the results of other layers, including the semantic representation vector and the semantic transfer relationships of the conversation data, can more accurately determine the conversation data that meet the actual service requirements, so that these conversation data can be used for conducting corresponding service processing that can effectively meet the corresponding service requirements, such as conducting service training, or conducting conversation assistance, and so on. This system for human-machine collaborative conversation interaction can be used in a wide variety of different working scenarios. For example, when applied to a conversation sample database for different services, it can determine data, from the conversation sample database, that meet the service requirements. For another example, when applied to a real-time human-machine interaction conversation process, it can assist in determining the conversation statements that more closely match the user's current interaction statements, and so on. This shows that the system for human-machine collaborative conversation interaction, according to different working scenarios and based on various conversation data in the working scenarios, can ultimately implement the determination of conversation data meeting the service requirements and the service processing, and thus can meet various collaborative conversation interaction requirements in actual intelligent conversation bot working scenarios.

FIG. 1 illustrates an example system applicable to a human-machine collaborative conversation interaction solution according to some embodiments of the present disclosure. As shown in FIG. 1, a system 100 may include a server 102, a communication network 104, and/or one or more user devices 106. In the example of FIG. 1, there are a plurality of user devices.

The server 102 may be any suitable server for storing information, data, programs, and/or any other suitable type of content. In some embodiments, the server 102 may perform any suitable function. For example, in some embodiments, the server 102 is provided with a system for human-machine collaborative conversation interaction. In some embodiments, the system for human-machine interaction includes: a conversational pre-training layer, a conversation representation learning layer, a conversational structure learning layer, and a service layer. Structural information of conversation data is output by the conversational pre-training layer. A semantic representation vector carrying phrase-dimensional semantic information, sentence-dimensional semantic information, and topic-dimensional semantic information corresponding to the conversation data is obtained by the conversation representation learning layer. Semantic transfer relationships between each turn of conversation is obtained by the conversation structure learning layer. Conversation data matching service requirements is determined by the service layer so as to perform preset service processing through the determined conversation data. As an optional example, in some embodiments, the server 102 may also execute corresponding instructions through the processor so as to invoke the system for human-machine collaborative conversation interaction to execute the corresponding method for human-machine collaborative conversation interaction. As another example, in some embodiments, the server 102 may send the result of the human-machine collaborative conversation interaction to the user devices.

In some embodiments, the communication network 104 may be any suitable combination of one or more wired and/or wireless networks. For example, the communication network 104 may include any one or more of: the Internet, an Intranet, a wide area network (WAN), a local area network (LAN), a wireless network, a digital subscriber line (DSL) network, a frame relay network, an asynchronous transfer mode (ATM) network, a virtual private network (VPN), and/or any other suitable communication network. The user device 106 may be connected via one or more communication links (e.g., communication link 112) to the communication network 104, and the communication network 104 can be linked to the server 102 via one or more communication links (e.g., communication link 114). The communication link may be any communication link suitable for transmitting data between the user device 106 and the server 102, such as a network link, a dial-up link, a wireless link, a hardwired link, any other suitable communication link, or any suitable combination of such links.

The user device 106 may include any one or more user devices suitable for performing data presentation. In some embodiments, the user device 106 may include any suitable type of device. For example, in some embodiments, the user device 106 may include a mobile device, a tablet computer, a laptop computer, a desktop computer, a wearable computer, a gaming console, a media player, a vehicle entertainment system, and/or any other suitable type of user device. In some embodiments, the user device 106 may additionally or alternatively be used to present the result of human-machine collaborative conversation interaction.

Although the server 102 is illustrated as a single device, in some embodiments, any suitable number of devices may be used to perform the functions performed by the server 102. For example, in some embodiments, multiple devices may be used to implement the functions performed by the server 102. Alternatively, a cloud service may be used to implement the functions performed by the server 102.

Based on the above system, the embodiments of the present disclosure provide a method for human-machine collaborative conversation interaction, which is illustrated by multiple embodiments below.

Figure 2A:
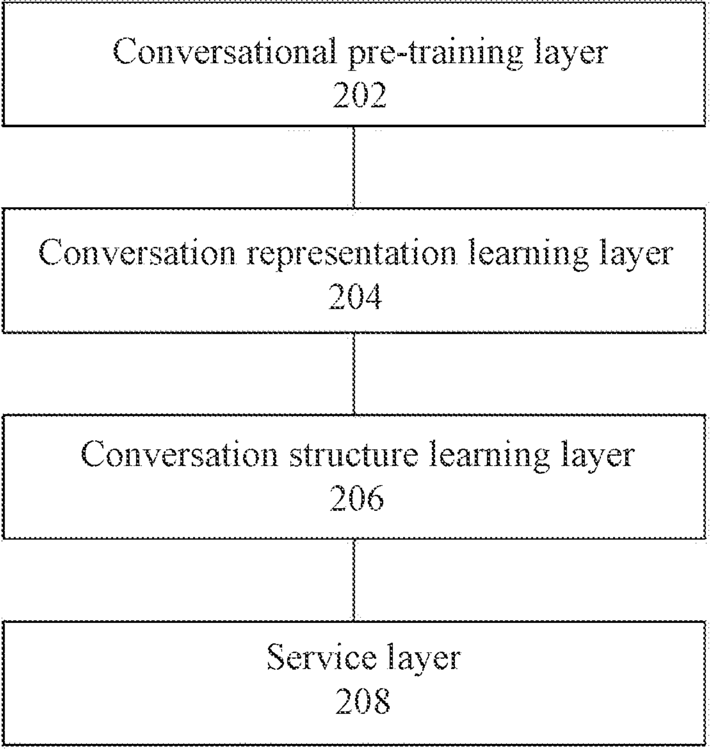
FIG. 2A is a structural block diagram of an example system for human-machine collaborative conversation interaction, according to some embodiments of the present disclosure.

Reference is made to FIG. 2A, which is a structural block diagram of an example system for human-machine collaborative conversation interaction, according to some embodiments of the present disclosure.

The system for human-machine collaborative conversation interaction of the embodiments of FIG. 2A includes: a conversational pre-training layer 202, a conversation representation learning layer 204, a conversation structure learning layer 206, and a service layer 208.

The conversational pre-training layer 202 is configured to output, according to conversation data to be processed, structural information of the conversation data, in which the conversation data includes multiple turns of conversation. The conversation representation learning layer 204 is configured to obtain, according to the structural information, a semantic representation vector carrying phrase-dimensional semantic information, sentence-dimensional semantic information and topic-dimensional semantic information corresponding to the conversation data. The conversation structure learning layer 206 is configured to obtain semantic transfer relationships between each turn of conversation according to the semantic representation vector. The service layer 208 is configured to determine, according to the semantic representation vector and the semantic transfer relationships, conversation data matching service requirements so as to perform preset service processing through the determined conversation data.

In some embodiments of the present disclosure, the conversation data to be processed may be conversation data involving services in any service industry, including but not limited to various customer service industries, online consultation industries, e-commerce industries, and so on. The structural information of the conversation data is configured to characterize the syntactic relationships within a conversation and/or the syntactic relationships between multiple turns of conversation. In a feasible approach, the conversational pre-training layer can output, according to the conversation data to be processed, structural information of an intra-sentence token structure of each turn of conversation and structural information of conversation dependencies of the multiple turns of conversation in the conversation data. The term "multiple turns" refers to multiple consecutive turns. These multiple turns of conversation may be associated or unassociated, or partially associated and partially unassociated. In addition, it should also be noted that in the embodiments of the present disclosure, the numbers of "multiple turns," "multiple," etc., that are related to "multiple" means two or more, unless otherwise specified.

On the basis of the structural information, the conversation data may be processed in different dimensions to obtain semantic information of the conversation data in different dimensions, including phrase-dimensional semantic information, sentence-dimensional semantic information, and topic-dimensional semantic information. The semantic relationships between phrases within each conversation can be accurately characterized from the phrase dimension. The context between multiple conversations can be effectively used to accurately characterize the semantic relationships between the multiple conversations from the sentence dimension. The intention and core idea to be expressed by each conversation can be accurately perceived from the topic perspective.

Then, based on the semantic information in different dimensions mentioned above, the semantic transfer relationships between the multiple conversations can be predicted more accurately. For example, assuming that there are three turns of conversation, which are, in order: A: "I like the movie made by director XX the most"; B: "What new movie has he recently made?"; C: "Have you eaten yet?", then, for the above conversations A, B, and C, the semantic transfer relationship between A and B may possibly indicate a higher probability of semantic transfer from A to B, while the semantic transfer relationships between A and C and between B and C may possibly indicate a lower probability of semantic transfer from A to C or from B to C. Based on this, in the subsequent determination of relevant conversations and analysis of the associations between the conversations, it is possible to distinguish the conversations with higher associations more effectively.

The service layer, on the other hand, based on the semantic representation vector and semantic transfer relationships obtained as mentioned above, can determine, according to the actual service requirements, conversation data matching service requirements so as to perform service processing, including but not limited to: service training, human-machine collaborative conversation interaction assistance, conversation data mining, and so on.

For example, the service layer can determine, according to the semantic representation vector and the semantic transfer relationships, conversation data for performing service training, and generate simulated conversation test questions according to the determined conversation data and user profile data. Further, optionally, the training process data for the service training based on the simulated conversation test questions can be obtained, and evaluation of the training effect can be performed based on the training process data.

For another example, the service layer can determine, according to the semantic representation vector and the semantic transfer relationships, conversation data for assisting services; and perform, based on the determined conversation data, at least one of streaming intention recognition processing, conversation context-based service response screening processing, or preset goal-based guided conversation screening processing.

For yet another example, the service layer can acquire conversation data during service processing and perform at least one of conversation flow mining processing, key conversation mining processing, or dialogue summary generation processing on the acquired conversation data.

As can be seen, with the embodiments of FIG. 2A, the system for human-machine collaborative conversation interaction is used to meet different service requirements. Through the conversational pre-training layer, the structural information of the conversation data can be obtained. The structural information can effectively characterize the syntactic structural relationships within the statements corresponding to the conversation data and the syntactic dependencies among multiple statements. Accordingly, an accurate basis can be provided for more accurate understanding of the semantics of the conversation data in the future. Through the conversation representation learning layer, the semantic representation vectors of the conversation data in several different dimensions can be obtained. The semantic representation vectors in different dimensions are complementary and cross-referential to each other, thus further ensuring the comprehensiveness and correctness of the semantic understanding of the conversation data. The conversation structure learning layer can analyze the semantics of the conversation mainly from the perspective of conversation turns so as to obtain the semantic transfer relationships between different turns of conversation. Accordingly, each conversation statement can take other statements as semantic reference and, particularly in the presence of pronouns, ellipses, etc., more accurate semantic information can be obtained. The service layer, based on the results of other layers, including the semantic representation vector and the semantic transfer relationships of the conversation data, can more accurately determine the conversation data that meet the actual service requirements, so that these conversation data can be used for conducting corresponding service processing that can effectively meet the corresponding service requirements, such as conducting service training, or conducting conversation assistance, and so on. This system for human-machine collaborative conversation interaction can be used in a wide variety of working scenarios. For example, when applied to a conversation sample database for different services, it can determine data, from the conversation sample database, that meet the service requirements. For another example, when applied to a real-time human-machine interaction conversation process, it can assist in determining the conversation statements that more closely match the customer's current interaction statements, and so on. This shows that the system for human-machine collaborative conversation interaction, according to different working scenarios and based on various conversation data in the working scenarios, can ultimately implement the determination of conversation data meeting the service requirements and the service processing, and thus can meet various collaborative conversation interaction requirements in actual intelligent conversation bot working scenarios.

Figure 2B:
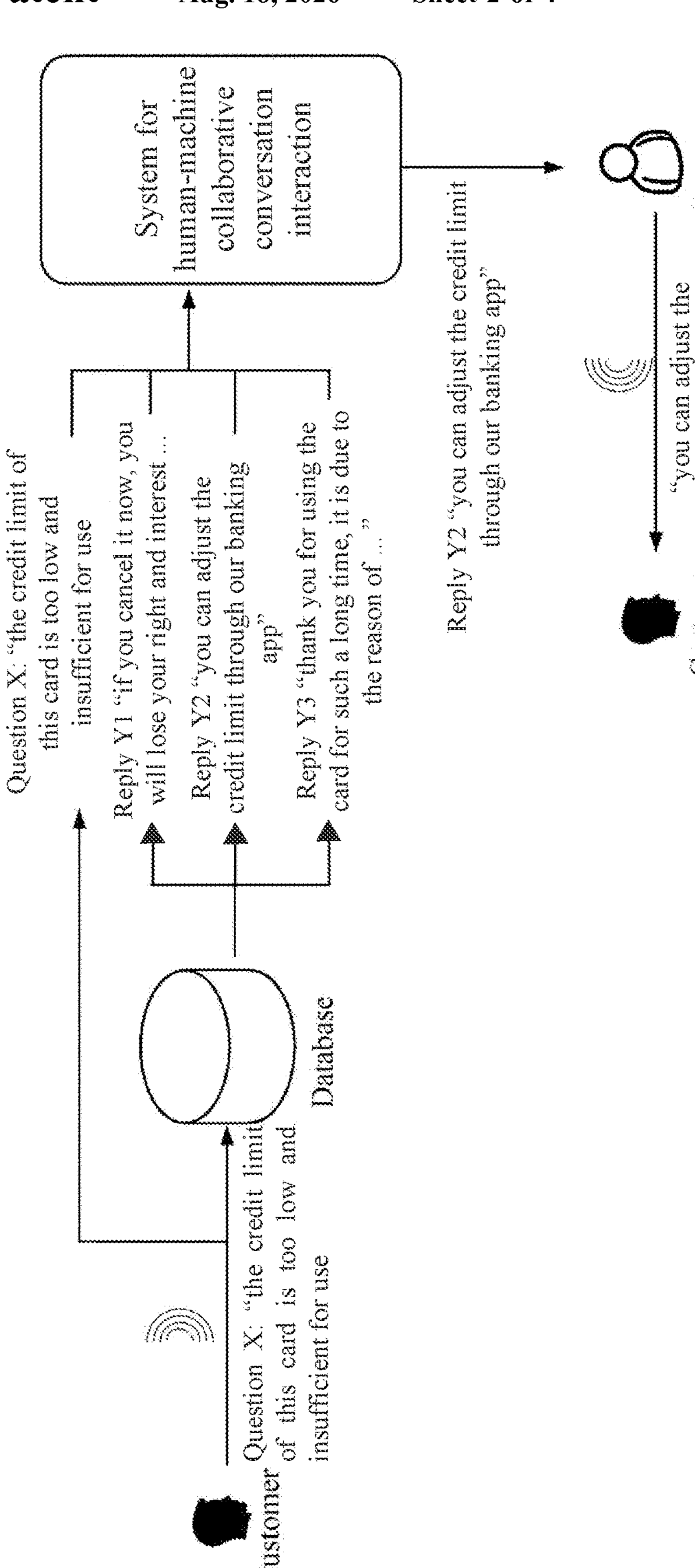
FIG. 2B is a diagram of an example scenario using a system for human-machine collaborative conversation interaction of the embodiments shown in FIG. 2A.

An exemplary illustration of the process of human-machine collaborative conversation interaction using the above system for human-machine collaborative conversation interaction is provided below with a specific example, as shown in FIG. 2B.

Assuming that, in a service process, a customer raises a question X, "the credit limit of this card is too low and insufficient for use," and three candidate replies matching the question X are found in the database, namely reply Y1 "if you cancel it now, you will lose your right and interest . . . ," reply Y2 "you can adjust the credit limit through our banking app," and reply Y3 "thank you for using the card for such a long time, it is due to the reason of . . . ". Then, the above question X and replies Y1, Y2 and Y3 are entered into the system for human-machine collaborative conversation interaction. The system for human-machine collaborative conversation interaction outputs through the conversational pre-training layer the structural information of question X and replies Y1, Y2 and Y3, including the structural information of each of the 4 conversations and the structural information among the 4 conversations. Then, based on the structural information, it obtains through the conversation representation learning layer a semantic representation vector corresponding to each of the 4 conversations that carries phrase-dimensional semantic information, sentence-dimensional semantic information, and topic-dimensional semantic information, and obtains through the conversation structure learning layer the semantic transfer relationships between the 4 conversations based on these semantic representation vectors. Taking the probability of semantic transfer as an example, assuming that the probability of semantic transfer from question X to reply Y1 is 0.39, the probability of semantic transfer from question X to reply Y2 is 0.9, and the probability of semantic transfer from question X to reply Y3 is 0.67, in this example, reply Y2 is recommended to the corresponding customer service agent, so that the customer service agent can interact with the customer according to reply Y2.

Of course, this example is relatively simple, and in practical applications, there may be more than one question and more corresponding candidate replies, but they can all be handled based on the system for human-machine collaborative conversation interaction provided by the embodiments of the present disclosure.

As can be seen from this example, the system for human-machine collaborative conversation interaction of the embodiments of the present disclosure can be effectively applied in the process of human-machine collaborative conversation interaction to provide interactive assistance to the relevant personnel to lead to a better interaction effect.

However, the system is not limited thereto. The above example is only an example of assisted interaction in the process of human-machine collaborative conversation interaction, and the system for human-machine collaborative conversation interaction provided by the embodiments of the present disclosure can be widely used in various service scenarios to provide various pre-service, in-service, and post-service services to meet different service requirements.

In some other embodiments, the embodiments focus on how to perform training to obtain the system for human-machine collaborative conversation interaction described in the embodiments above, to illustrate the human-machine collaborative conversation interaction solution provided by the embodiment of the present disclosure.

Figure 3:
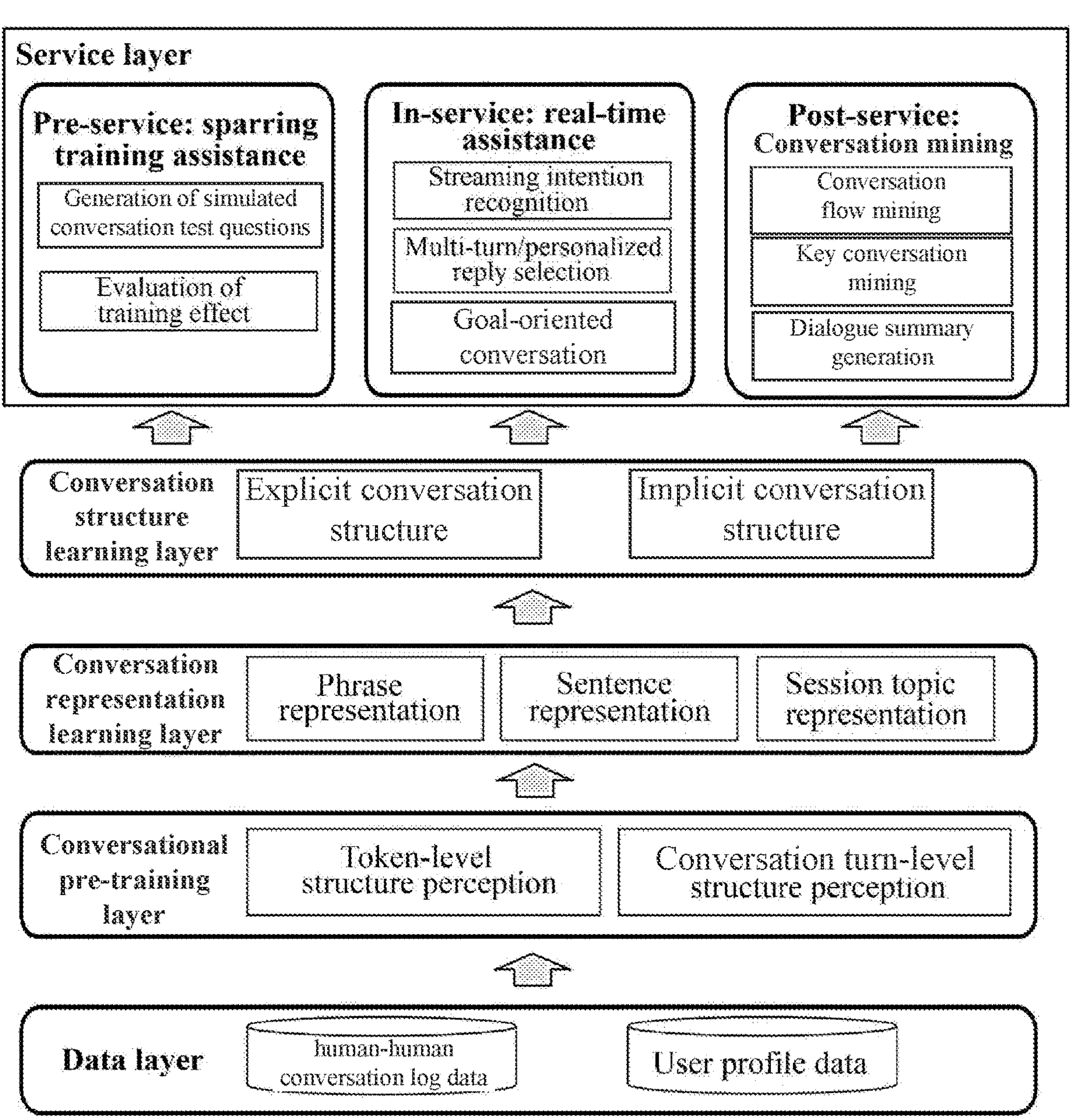
FIG. 3 is a schematic structural diagram of an example system for human-machine collaborative conversation interaction, according to some embodiments of the present disclosure.

Reference is made to FIG. 3, which is a schematic structural diagram of an example system for human-machine collaborative conversation interaction, according to some embodiments of the present disclosure. The system includes, in addition to a conversational pre-training layer, a conversation representation learning layer, a conversation structure learning layer, and a service layer as described in the above embodiments, a data layer. The data layer is primarily used to provide training data during the training stage for the system for human-machine collaborative conversation interaction. Exemplarily, this data layer can obtain or store the human-human conversation log data and user profile data for the corresponding service industry. However, the present disclosure is not limited thereto. This data layer can also provide other data tailored to the actual needs in practical applications.

In the training stage of the system for human-machine collaborative conversation interaction, the conversational pre-training layer is configured to train a pre-trained language model with respect to a conversation structure based on conversation data samples of a set service to obtain a pre-trained language model capable of outputting structural information carrying the conversation data samples. The conversation data samples include data samples of multiple turns of conversation. The conversation representation learning layer is configured to perform, according to a representation vector output by the trained pre-trained language model, phrase representation training, sentence vector representation training, and topic representation training for the conversation data samples by a machine learning model of the conversation representation learning layer to obtain a machine learning model capable of inputting a representation vector carrying corresponding phrase-dimensional semantic information, sentence-dimensional semantic information, and topic-dimensional semantic information. The conversation structure learning layer is configured to perform, according to the representation vector output by the trained machine learning model, training of performing semantic analysis for the multiple turns of conversation to obtain the semantic transfer relationships between the turns of conversation. The service layer is configured to perform training of determining the conversation data matching service requirements of the set service according to the semantic representation vector and the semantic transfer relationships, so as to perform preset service processing through the determined conversation data.

The set service may be any service involving human-machine collaborative conversation interaction, including but not limited to services in various customer service industries, services in the online consultation industry, services in the e-commerce industry, and so on. For each service, the corresponding historical conversation data can be obtained from its historical data. These historical conversation data contain a large amount of under-explored value and knowledge, and the use of them as conversation data samples for training the system for human-machine collaborative conversation interaction saves the cost of sample acquisition, improves the efficiency of sample acquisition, and makes the trained human-machine collaborative conversation interaction system better meet the actual needs.

Regarding the training of the conversational pre-training layer, in a feasible approach, the training of the pre-trained language model with respect to the conversation structure by the conversational pre-training layer includes: training for an intra-sentence token structure in the conversation data samples, and training for conversation dependencies between the multiple turns of conversation in the conversation data samples. The training of the intra-sentence token structure enables the pre-trained language model to effectively learn the grammatical relationships between tokens in data samples of a single turn of conversation. The training of multiple turns of conversation enables the effective learning of semantic-based conversation dependencies between the multiple turns of conversation. The token can be a character, a word or a phrase.

Here, the training for the intra-sentence token structure in the conversation data samples may include: performing token feature extraction on a first sub-machine learning model using tokens corresponding to the conversation data samples as an input to the first sub-machine learning model to obtain a first sub-representation vector, performing syntactic structure feature extraction on a second sub-machine learning model using part-of-speech information of tokens corresponding to the conversation data samples and a syntactic dependency tree obtained by syntactic analysis of the conversation data samples based on the tokens as an input to the second sub-machine learning model, so as to obtain a second sub-representation vector, and concatenating the first sub-representation vector and the second sub-representation vector to obtain a token structure representation vector carrying information of the intra-sentence token structure of the conversation data samples.

Exemplarily, each conversation data sample may contain: tokens in the conversation statement represented by that sample, part-of-speech information of each token, and a syntactic dependency tree at the token level obtained based on the semantic analysis parser. Here, a token is input to a BERT model (the first sub-machine learning model) for token feature extraction, and a corresponding feature vector feature 1 (the first sub-representation vector) is obtained. The part-of-speech information of the token and the syntactic dependency tree corresponding to the token are input to the graph neural network (GNN) (the second sub-machine learning model) for feature extraction, and a corresponding feature vector feature 2 (the second sub-representation vector) is obtained. Then, after concatenating these two vectors feature 1 and feature 2, a final vector, i.e., the token structure representation vector F1, is obtained.

It should be noted that although the BERT model and GNN model can achieve better training results, in practical applications, other appropriate model forms can also be applied to the solution of the embodiments of the present disclosure, provided that they have the corresponding functions.

Through the above-mentioned training for the intra-sentence token structure, by introducing syntactic analysis and other capabilities, the machine learning model in the conversational pre-training layer can learn the token-level structure knowledge in sentences, thus allowing the model to work better at solving upper-level tasks such as intention recognition and emotion recognition for long and difficult sentences. Through the above training, it is possible to enable the model to have the function of structure perception at the token level within sentences, which is illustrated as "token-level structure perception" in FIG. 3.

In a feasible approach, the training for the conversation dependencies between the multiple turns of conversation in the conversation data samples may include: training, by a third sub-machine learning model based on semantic similarities between sample features of the data samples of the turns of conversation, to obtain a conversation structure representation vector characterizing dependencies between the turns of conversation.

In a specific approach, the above process may be implemented as follows: masking tokens in data samples of a part of the turns of conversation among the data samples of the multiple turns of conversation to obtain data samples of the multiple turns of conversation containing the masked data, and determining, by the third sub-machine learning model, semantic similarities between sample features of the data samples of the turns of conversation based on the data samples of the multiple turns of conversation containing the masked data, and training to obtain the conversation structure representation vector characterizing the dependencies between the turns of conversation.

Exemplarily, a [CLS] token representing the conversation can be added in front of the token of the data sample of each turn of conversation, and the embedding corresponding to this token can be taken as the feature of the conversation, to model the relationships between different turns of conversation in the data samples of the multiple turns of conversation through a model such as BERT (the third sub-machine learning model). Further, optionally, the token of a certain turn of conversation (or several turns of conversation) can be simultaneously modified to a mask at a certain probability, and the token of the conversation can be predicted while modeling the relationships between different turns of conversation in the data samples of the multiple turns of conversation.

The above training for the conversation dependencies of the multiple turns of conversation can enable the third sub-machine learning model to learn the structure knowledge at the conversation turn level. By introducing tasks such as mask-reconstruction and reply selection (e.g., inputting a piece of conversation and retrieving the most relevant replies from the pool of reply candidates) at the conversation turn level, the machine learning model at the conversational pre-training layer can be enabled to learn the dependencies at the conversation turn level, thus providing basic support for the learning of the upper conversation representation layer, the learning of the conversation structure learning layer, and so on. In FIG. 3, it is illustrated as "conversation turn-level structure perception."

As can be seen, by modeling on the conversational pre-training layer at the above two dimensions, the machine learning model in the conversational pre-training layer works better at solving tasks in real human-human conversations, such as streaming intention understanding, long and difficult sentence representation learning, and conversation structure learning, than the conventional pre-trained language model.

Regarding the training of the conversation representation learning layer, based on the training results of the conversational pre-training layer, the training of the machine learning model in the conversation representation learning layer includes: phrase representation training, sentence vector representation training, and topic representation training for the conversation data samples.

In a feasible approach, the phrase representation training for the conversation data samples includes: performing word segmentation processing on the conversation data samples to obtain multiple segmented words, and performing the phrase representation training of the machine learning model of the conversation representation learning layer with respect to the conversation data samples according to the cohesion and degree of freedom of the multiple segmented words, the representation vector obtained through the pre-trained language model, and a preset contrastive learning loss function. This approach mainly enables the machine learning model in the conversation representation learning layer to learn semantic information in the phrase dimension.

The cohesion of segmented words is used to characterize the comparison of the magnitude of the product of the probabilities of the segmented words appearing individually with the probability of them appearing together. The degree of freedom of segmented words is used to characterize the degree of randomness of combinations of the segmented words. For example, the information entropy may be used to measure the degree of randomness of the set of left-neighboring segmented words and the set of right-neighboring segmented words of a segmented word.

The contrastive learning loss function is a loss function for dimensionality reduction learning. It can learn a mapping relationship that allows points of the same category but farther away in a high-dimensional space to become closer after being mapped by the function to a low-dimensional space, and points of different categories but closer to become farther away in the low-dimensional space after being mapped. As a result, in the low-dimensional space, points of the same category will produce the effect of clustering, and points of different categories will be separated. In the embodiment of the present disclosure, based on this characteristic of the contrastive learning loss function, it is applied to the training of the machine learning model of the embodiments of the present disclosure, so that the semantically relevant segmented word positive samples are closer to each other while the semantically irrelevant segmented word negative samples are further away from each other, so as to uncover effective information and exclude useless information to achieve the effect of deep contextual understanding.

Exemplarily, a phrase representation training process includes: performing word segmentation processing on the conversation data samples to obtain multiple segmented words, performing calculations of the cohesion and degree of freedom of the obtained segmented words, constructing semantic units according to the calculation results and the representation vectors obtained through the pre-trained language model, and performing contrastive learning based on the semantic units and the contrastive learning loss function. In an optional approach, the semantic unit may be subjected to mask processing to obtain the embedding average of the masked part; and then it is made closer to the encoding result of the semantic unit per se (positive sample) and farther away from the negative sample of the semantic unit that is randomly negatively sampled. The phrase representation training of the machine learning model of the conversation representation learning layer with respect to the conversation data samples is performed based on the result of the contrastive learning loss function.

In another feasible approach, the sentence vector representation training for the conversation data samples includes: determining, from the conversation data samples, conversation sample data to be processed, and forming conversation sample data pairs; obtaining, based on the pre-trained language model, representation vector pairs corresponding to the conversation sample data pairs; and performing mutual representation processing of the representation vector pairs by the machine learning model of the conversation representation learning layer, and performing the sentence vector representation training for the conversation data samples based on the result of the mutual representation processing. The mutual representation processing is also known as mutual attention processing, which can obtain the degree of matching between two vectors based on the attention mechanism. In this way, the model can effectively learn the relationships between conversations.

Exemplarily, after forming the conversation sample data pairs, subsequent processing can be performed based on the output of the pre-trained language model (including but not limited to: BERT, XLNet, UniLM, GPT, T5, and the like). For example, representation vectors, such as independent encoded representations, of two sentences of a conversation sample data pair can be obtained first based on the pre-trained language model. After that, the two representation vectors are subjected to mutual representation processing and a mutual representation result is calculated. Finally, the cosine distance of the mutual representation result is optimized.

In a specific example, the above process may include three processes. In the first process, for two sentences A and B of a conversation sample data pair, firstly, the pre-trained language model is applied to encode them and extract the high-dimensional feature vectors corresponding to each of their tokens. Next, the high-dimensional vectors at each position are stacked row by row to form two feature matrices M and N.

In the second process, the feature matrix N is transposed and matrix multiplication is conducted on the M matrix and the transposed matrix of N to obtain a square matrix Q. The number of rows and the number of columns of this square matrix Q is the greatest text sequence length that the pre-trained language model can accept. Each element of this square matrix Q represents the dot product similarity of feature vectors at the corresponding positions of the two feature matrices M and N.

In the third process, this square matrix Q is used to separately multiply with the two feature matrices M and N to obtain new feature matrices M' and N' corresponding to the two feature matrices, and the final sentence vector is obtained by separately applying row average pooling to M' and N'. Then, the learning of the machine learning model of the conversation representation learning layer is completed by optimizing the cosine similarity of the sentence vectors of the two.

The specific implementation of the above process is different for different scenarios. For the conversation scenario, first, the conversation dataset is pre-processed to complete standard data processing processes such as data normalization (e.g., normalization of names, addresses, and entities), stop word removal, and merging of consecutive speeches. After that, conversation data samples for training are constructed. For example, a conversation and one of the turns therein are randomly selected, and the text corresponding to that turn of conversation is considered to be the above B sentence, while all the rest of the texts are considered to be the above A sentence. Each turn of A sentence and the unique B sentence are separately sent into the pre-trained language model for encoding processing, and the final A-sentence representation vector is obtained by summing all the turns. The A-sentence representation vector and the B-sentence representation vector are subjected to mutual representation calculation. Finally, the cosine distance loss of the sentence vectors corresponding to the two is optimized. It should be noted that when the A and B sentences come from one conversation session (i.e., positive sample), their cosine distance is subjected to minimization processing. When the A and B sentences come from different conversation sessions (i.e., negative sample), their cosine distance is subjected to maximization processing.

For NLI, PI, and machine translation scenarios, since the parallel corpus pairs in the NLI/PI/machine translation dataset often come from manual labeling, no further special pre-processing is required. Each sentence pair in the parallel corpus is split into an A sentence and a B sentence, which are sent into two independent pre-trained language models, respectively. The corresponding sentence representation vectors are extracted and then subjected to mutual representation processing. Finally, the cosine distance loss of the sentence vectors corresponding to the two is optimized. If the two sentences do represent the same semantic, their cosine distance is subjected to minimization processing; otherwise, their cosine distance is subjected to maximization processing.

For a single-sentence scenario with only one sentence, the same pre-trained language model (with a dropout rate of 0.1) is used to encode this sentence twice, and the two encoding results are considered as the encoding results (representation vectors) corresponding to the A sentence and the B sentence, to perform mutual representation calculation. Finally, the cosine distance loss of the sentence vectors corresponding to the two is optimized. If the same sentence is encoded twice by this language model, their cosine distance is subjected to minimization processing; otherwise, their cosine distance is subjected to maximization processing.

For topic representation training, the pre-trained language model needs to include a first sub pre-trained model and a second sub pre-trained model. The first sub pre-trained model is configured to perform training for the conversation structure according to token information corresponding to data samples of each turn of conversation. The second sub pre-trained model is configured to perform training for the conversation structure according to turn information, role information, token information, and token position information corresponding to data samples of each turn of conversation. On this basis, the topic representation training for the conversation data samples performed, according to the representation vector output by the trained pre-trained language model, by the machine learning model of the conversation representation learning layer may include: performing the topic representation training for the conversation data samples by the machine learning model of the conversation representation learning layer according to a representation vector output by the trained second sub pre-trained model. In this way, it is possible to accurately enable the trained machine learning model to have a better intention discrimination capability.

In the embodiments of the present disclosure, the second sub pre-trained model is named a conversation pre-trained language model (CPLM). Unlike the conventional pre-trained language model, the CPLM contains conversation-specific information, such as the turn number, the role, and the like. Specifically, the CPLM uses four types of inputs to model text and conversation information, namely: token id (token information), position index (token position information), turn index (turn information), and role label (role information). The token id and the position index are the ID corresponding to the token contained in any turn of the conversation and the position relative to the beginning of the sentence. The turn index and the role label are the turn serial number and role label of any turn. After masking the token vector in the conversation, the task of reconstructing the masked token is completed with these four inputs, so as to perform learning of the CPLM with respect to the conversation structure. Optionally, the CPLM may be implemented as a multilayer transformer-type model that is trained based on mask-reconstruction tasks, such as DialogGPT, TOD-BERT, and the like.

Once the CPLM learning is completed, the learning of the conversation topic representation can be started. The input for the conversation topic representation training is a complete conversation in the same form as the above four types of inputs. In order to learn correct conversation topic representations, it is necessary to construct training data required for the model, including the following two steps.

The first step is the data pre-processing and preparation of training data. A training set, a validation set, and a test set are segmented from the original sample dataset, and routine data cleaning is performed, such as data anonymization, filtering of abnormal conversations, and the like. Taking a human-human conversation log as an example, it is processed into the data format required by the conversation topic representation model, that is, one session per row, and all dialogs of each session are concatenated using delimiters and attached with the corresponding role information.

The second step is the construction of positive and negative samples. In order to learn conversation topic representations, it is necessary to further construct positive and negative sample pairs. The positive samples are the original conversation, and the negative samples are obtained through sampling, specifically in three sub-steps: (1) firstly, aggregating the dialogs of each role in the conversation to form a negative sample pool; (2) fixing dialogs of one role in the positive samples and randomly sampling dialogs of another role from the negative sample pool to fill in the corresponding position for that role; and (3) truncating the part of the turn length that is too short or too long to complete the construction of negative samples. After the negative samples are constructed, the positive samples and the negative samples that match with them are sent into the machine learning model together to minimize the distance between the representation vectors of multiple roles of the positive samples and maximize the distance between the representation vectors of multiple roles of the negative samples. The final conversation topic representation results are obtained when the model converges.

With the above conversational phrase representation training, conversational sentence vector representation training, and conversation session topic representation training, the conversation representation learning layer can learn the best possible topic representation vectors for phrases, sentences, and the conversation itself from the conversation data samples. The basic paradigms for the above three trainings are all built on the basis of a conversational pre-trained language model that can output structural information, and trainings are accomplished through tasks such as mask-reconstruction or positive and negative sample prediction. It should be noted that the conversational phrase representation training improves the training effect by contrastive learning. The conversational sentence vector representation training makes full use of the multi-turn conversation context to complete the sentence vector representation training. The conversation topic representation training, through the four types of input, achieves a "self-guided" mechanism to complete the topic-perceptive high-dimensional embedding of the conversation itself Δt the same time, the three trainings also jointly focus on how to use data beyond conversations for better learning, such as supervised learning of labeled data (similar sentence pairs, and translation parallel corpus) and unlabeled massive text, and make full use of various forms of data such as conversations and translations by mutual representation processing. In this way, on the basis of the conversational pre-training layer, the conversation representation learning layer achieves high-dimensional embedding of various levels of entities of the conversation, which is the basis for deep conversation understanding and the implementation of the conversation structure learning.

Regarding the training of the conversation structure learning layer, for the conversation structure learning layer, the embodiments of the present disclosure provide training in two ways, i.e., explicit conversation structure learning training and implicit conversation structure learning training. Specifically, the explicit conversation structure learning training is, for the conversation structure learning layer, performing training of: performing discretization processing of the representation vector output by the trained machine learning model of the conversation representation learning layer, and performing semantic analysis for the multiple turns of conversation according to the result of the discretization processing to obtain the semantic transfer relationships between the turns of conversation.

Exemplarily, the explicit conversation structure learning training first completes the high-dimensional embedding of atomic entities, such as phrases, sentences, and conversation topics, within the conversation through the conversation representation learning layer, and then completes the discretization processing of the conversation by clustering (including but not limited to KMeans, DBScan, and other algorithms), and further, based on the discretization processing, performs semantic analysis (including statistics of transfer probabilities between meaning, states, and actions) of the conversation, so as to understand the conversation process in a structured way.

Alternatively, the implicit conversation structure learning training is, for the conversation structure learning layer, performing training of: performing auto-encoding processing based on the representation vector output by the trained machine learning model of the conversation representation learning layer, and performing conversation task modeling according to the result of the auto-encoding processing and obtaining the semantic transfer relationships between the turns of conversation according to the result of the modeling.

The implicit conversation structure learning training is directly based on the representation vectors output by the conversation representation learning layer, and by introducing variational auto-encoders such as VAE and CVAE on this basis, the learning of the implicit structure of the conversation is implemented in the process of modeling conversation tasks, such as reply selection and reply generation, in combination with a re-parameterization approach. The result of learning is a direct conversation structure graph.

Exemplarily, the conversation of each turn is encoded by the machine learning model of the conversation representation learning layer, and the encoded result, through two other machine learning models, separately results in the predictions of the mean and variance corresponding to a discretized ID. On this basis, the mean and variance are sampled to obtain a context embedding so as to carry out the tasks of reply selection of multiple turns (in accordance with the given multi-turn conversation context, selecting from among the retrieved candidate replies the one that best answers the current question) and reply generation of multiple turns.

In an example in which the implicit conversation structure learning training is performed based on the joint modeling of two tasks of reply selection and reply generation, it may be based on any models capable of modeling of reply selection and reply generation tasks, including but not limited to: convolutional neural networks, recurrent neural networks, pre-trained language models, graph neural networks, and the like. The illustration is provided below as to how to construct the training data required for reply selection and reply generation, and how to implicitly implement the learning training of the conversation structure based on the two kinds of training data.

The first step is data preparation and pre-processing. To prepare the training data for modeling of reply selection and reply generation tasks, the original conversation dataset can be pre-processed first, where standard processing processes such as data anonymization, stop word removal, word segmentation, and filtering of abnormal conversations.

For each conversation in the cleaned conversation dataset, a certain turn is randomly selected as the segmentation point, and turns before the segmentation point are taken as the conversation context and this turn is taken as the target reply to form a context-target reply pair, which becomes a positive sample for the reply selection and reply generation tasks. By fixing this context and randomly selecting one turn of speech from all the conversations to match it, a context-non-target reply pair is formed, which becomes a negative sample for the reply selection and reply generation tasks.

All the above training samples are collected together as a complete sample dataset, and further segmented into a training set and a test set proportionally, so as to complete the training and evaluation.

The second step is joint modeling of reply selection and reply generation tasks. The underlying models on which modeling of reply selection and reply generation tasks is based may be any models applied to natural language processing tasks, including but not limited to: convolutional neural networks, recurrent neural networks, pre-trained language models, and graph neural networks.

Firstly, these models are used to encode the context in the training set. The steps include: if a convolutional neural network, recurrent neural network, and graph neural network are used, a single turn of conversation is first encoded; next, the above neural networks are applied once more to the encoding result to acquire an aggregation vector at the turn level as the context encoded vector. If a pre-trained language model is used, the conversation of each turn is concatenated into a whole sequence in the word dimension and the [CLS] features in the pre-trained language model are extracted as the context encoded vectors.

To perform implicit learning training of the conversation structure, after this encoded vector, a nonlinear mapping layer is accessed to map the representation to an N-dimensional vector, with N representing the number of discrete states. Further, gumbel-softmax sampling is performed based on the discrete state to obtain a semantic vector representing the state. In the reply selection task, this semantic vector is used below to calculate the semantic distance as the loss value of the model. In the reply generation task, this semantic vector is used as an initialization vector of the decoder, so that the decoder gradually completes the decoding of the target reply, and the difference between the decoding result and the target reply is used as the loss value of the model. The joint modeling of the two tasks is completed by optimizing the sum of the two loss values.

The third step is structuralization processing of the conversation. After the model training converges, the N-dimensional vector corresponding to the context encoded vector is the prediction result of the probability for the context structuralization in that state. The index corresponding to the maximum value is extracted from this N-dimensional vector to complete the conversation structuralization processing.

Through the above process, the conversation structure learning layer can learn the semantic information in the conversation that includes the meaning, state, and action, as well as a matrix of transfer probabilities between them, so as to understand the conversation process in a structured way. The two learning training approaches, i.e., the explicit conversation structure learning training and the implicit conversation structure learning training, can be applied to different scenarios. For example, in the open domain conversation scenario, the use of the explicit conversation structure learning training leads to a better effect. In the task-type conversation scenario, the use of the implicit conversation structure learning training leads to a better effect. The embodiments of the present disclosure include both conversation structure learning training approaches, and for the explicit conversation structure learning training, three basic tasks and the corresponding implementation solutions are obtained through the conversation representation learning layer. For the implicit conversation structure learning training, based on the joint conversation modeling tasks of reply selection and reply generation, a better conversation structure learning training effect can be achieved. Based on this, through the conversation structure learning layer, it is possible to learn the explicit conversation structure and implicit conversation structure, as shown in FIG. 3.

Regarding the training of the service layer, in the service layer, online algorithm applications and off-line mining applications can be deployed to provide various algorithm capabilities that are built on the basis of the various layers described above and directly correspond to the actually required intelligent assistant product functions.

On this basis, at least one of the following approaches can be used for training. In the first approach, for the service layer, the following trainings may be performed: determining conversation data for performing service training according to the semantic representation vectors output by the aforementioned conversation representation learning layer and the semantic transfer relationships output by the aforementioned conversation structure learning layer, and generating simulated conversation test questions according to the determined conversation data and the user profile data, and performing service training through the simulated conversation test questions.

In this way, for multiple turns of conversation, based on their corresponding semantic representation vectors and semantic transfer relationships, conversations that can be used for service training can be selected. Then, the selected conversations are combined with the user profile data to generate suitable simulated conversation test questions to achieve the task of service training.

In the subsequent specific application stage, the service provider can set up a conversation sample database in advance, so that multiple conversations can be selected from it based on the above approach. Some or all of the conversations can be filtered from the multiple conversations based on the semantic representation vectors and semantic transfer relationships corresponding to the multiple conversations. Then, simulated conversation test questions can be generated based on the user profile data and the filtered conversations.

In this way, the service providers can be effectively trained for the pre-service stage to improve their service level and achieve the improvement of the service training efficiency at low cost.

In the second approach, for the service layer, the following training may also be performed: obtaining training process data for service training that is based on the simulated conversation test questions, and performing the evaluation of the training effect based on the training process data.

The training process data effectively reflects the effect of the service training conducted by the service provider using the simulated conversation test questions, and training based on this can effectively improve the training efficiency.

The above first and second approaches can both be adapted to pre-service service requirements. Through the above training process, in a customer service example scenario, generation of simulated conversation test questions and evaluation of the training effect can be achieved.

Regarding the generation of simulated conversation test questions, in the process of customer service training, novice customer service agents often lack actual conversation practice, which leads to problems such as unskilled service after joining the job. Through the above training approaches for the service layer, simulated conversation test questions can be generated based on user profile data and conversation data, where the test questions can provide natural conversation interactions around key points of the service and provide novice customer service agents with immersive conversation practice opportunities at low cost to improve their service level.

For example, by combining the above training approaches for the service layer with the recognition results of recognition of the user profile by the conversation-dimensional profile recognition model, the simulated conversation test questions are generated in a targeted manner. The conversation-dimensional profile recognition model includes, but is not limited to, a convolutional neural network, a recurrent neural network, a pre-trained language model, and the like. The recognition approach includes, but is not limited to, a two-stage approach of first recognizing the features of a single turn of conversation and then aggregating the dimensional features of multiple turns of conversations, or a one-stage approach of concatenating various turns of conversation together and completing the recognition at one time.

Regarding the evaluation of the training effect, in a specific example, the effect evaluation can be realized as scoring the quality of the conversation service. Timely and effective feedback is essential for novice customer service agents to improve their service capabilities. However, the feedback of the customer service agents in realistic scenarios relies on supervisor communication or customer evaluation, which has the problems of strong noise, poor pertinence, and high acquisition cost. Through the above training of the service layer, the service quality can be automatically scored based on the completion situation of the simulated conversation test questions by the customer service agent. After the novice customer service agent completes the simulated conversation test questions, targeted scores of the conversation service quality are given from various dimensions such as conversation completion, service attitude and fluency, so as to help the novice customer service agent to improve his or her service ability efficiently.

In the third approach, for the service layer, it is also possible to perform training of: determining, according to the semantic representation vector and the semantic transfer relationships, conversation data for assisting services; performing, based on the determined conversation data, at least one of streaming intention recognition processing, conversation context-based service response screening processing, or preset goal-based guided conversation screening processing; and performing service processing according to the result of the processing.

The streaming intention recognition processing is to dynamically identify semantic segmentation points in a continuous conversation input in a streaming manner and give the intention labels of the semantic fragments.

Conversation context-based service response screening processing can be implemented as online multi-turn reply selection or personalized multi-turn conversation reply selection. The online multi-turn reply selection is to select a reply that can best answer the current question from the retrieved candidate replies based on the given multi-turn conversation context. The personalized multi-turn conversation reply selection is to incorporate personalized information of the agent on the basis of online multi-turn reply selection to enable the intelligent assistant customer service system to have anthropomorphic characteristics.

The preset goal-based guided conversation screening processing is mainly used to guide the direction of the conversation.

The above third approach can be adapted to in-service service requirements. Through the above training process, in a customer service example scenario, the streaming intention recognition processing, online multi-turn reply selection/personalized online multi-turn reply selection processing, and guided conversation screening processing can be achieved.

For streaming intention recognition processing, intention recognition is a classical natural language processing task, and there are already many mature solutions for short sentences and simple sentences that can well solve this task. However, since the intelligent assistant customer service system is in a human-machine collaborative environment (where the machine learns knowledge from the customer-human customer service agent conversation, and assists and guides the human customer service agents to complete the incoming tasks), and the two parties of the conversation mainly describe the problem and state the solution, so the contents of the conversation are mainly long and difficult sentences. The embodiments of the present disclosure achieve joint modeling of structural and semantic understanding of long and difficult sentences by introducing a structure-perceptive conversational pre-trained language model as a base to perform streaming intention recognition, thereby resulting in better results in the understanding of long and difficult sentences.

Exemplarily, the streaming intention recognition can be divided into two stages: a training stage and a prediction stage. The training samples may be the online large-scale human-human conversation logs of the customer service system, and the streaming intention recognition model is trained by using the semantic segmentation points existing in the data in the logs. After the model is trained, it has the semantic segmentation capability, so as to perform online semantic segmentation and prediction and complete the streaming intention recognition task. In some embodiments of the present disclosure, the streaming intention recognition model may include, but not limited to, a convolutional neural network model, a recurrent neural network model, a pre-trained language model, and other deep learning models.

Specifically, the above process may include the following steps.

The first step is data preparation and pre-processing. In order to build the training samples required for the streaming intention recognition model, the conversation data in the human-human conversation logs are first cleaned and processed to complete the processing such as conversation data anonymization, stop word removal, word segmentation, and filtering of abnormal conversations. For each conversation after the cleaning processing, the sentence length-turn ratio statistics are performed. For example, the sentence length-turn ratios of all conversations are calculated, and the ratios are sorted from small to large, and the first 50% of the data is intercepted to build the training sample set. Then, the conversations can be concatenated together through data pre-processing, and a [CLS] token can be added as the sequence prefix to form the text input that is to be input into the model for training. For each conversation, the data pre-processing simultaneously generates a corresponding label sequence, where each label in the label sequence corresponds to a token (character or word) in the sequence, and this label reflects whether the position is an intention segmentation point in the original conversation.

The second step is training of the streaming intention understanding model. Once the training sample set is constructed, the training for prediction of the intention segmentation point can be performed on the streaming intention recognition model based on the selected deep learning model. Specifically, the model reads a text concatenated together by conversations as well as its associated sequence labels, outputs the predicted probability value P(n) at position n, and calculates the cross-entropy loss between P(n) and the labels associated with position n, and by aggregating the losses at all positions as the total loss of this sample. By optimizing this loss, the model continuously improves the prediction accuracy of the semantic segmentation point, and the model, after convergence, has the capability of predicting the semantic segmentation point.

The third step is predicting the semantic segmentation point using the trained model and performing streaming intention recognition. The prediction of the semantic segmentation point is divided into two specific application scenarios: an off-line analysis scenario and an online prediction scenario. For the off-line analysis scenario, the trained model is deployed to the off-line analysis environment, and the conversations to be processed are concatenated into long text sequences according to the formats of the training samples. After the long text sequences are input to the model one by one, the model generates a prediction probability P'(n) at each position, and sets a certain threshold r. When P'(n)>=r, that position is considered as the semantic segmentation point and the text is segmented, where r can be flexibly set by a person skilled in the art according to the actual needs. Multiple text segments obtained according to the segmentation result are used as the input text of the streaming intention recognition model for intention prediction, then the final streaming intention label prediction result can be obtained. For the online prediction scenario, due to the limitation of the actual calculation speed of the model, it is difficult to conduct one prediction for the whole text sequence each time an input token arrives. At this time, an input token accumulation method is adopted. Specifically, when the length of the input tokens accumulates to a multiple of certain value (e.g., 2, 3, 4, etc.), one prediction is conducted, and semantic segmentation is performed based on the predicted result. The subsequent process is the same as the off-line analysis process to complete the streaming intention recognition task.

For online multi-turn reply selection/personalized online multi-turn reply selection processing, the online multi-turn reply selection task is to, given the human-human conversation context, select the best candidate script to reply to the customer by scoring and sorting the candidate replies in accordance with their semantic relevance to the context. In some embodiments of the present disclosure, the results of the conversation structure learning are used to score the scripts at the cluster level according to the conversation results, thereby increasing the diversity of scripts and enabling the recommendation of high-quality scripts. In particular, personalized factors such as the habitual expressions of the agent, the profile and emotions of the customer may also be considered in the modeling process to implement the multi-turn personalized reply selection task, thus resulting in better results.

For guided conversation screening processing (i.e., online goal-oriented conversation processing), in the conversation process, first, the goal of the conversation is planned, such as what kind of goods are marketed and what kind of problems are solved. Then, during the conversation process, the conversation is actively guided towards the goal of the conversation. Through the service layer, the goal-oriented conversation can be realized based on the determined conversation data for assisting the service and the scoring approach for historical similar conversation analysis.

In the fourth approach, for the service layer, the following training can be further performed: acquiring conversation data during service processing and performing at least one of conversation flow mining processing, key conversation mining processing, or dialogue summary generation processing on the acquired conversation data.

The conversation flow mining processing is the processing of mining the global flowchart of a conversation from a certain segment of historical conversation. The key conversation mining processing is the processing of mining the most recommended reply and reply manner based on the historical conversations. The dialogue summary generation processing is the processing of extracting the most essential information from the conversation by performing rewriting and extraction of the key information in the historical conversation.

The above fourth approach can be adapted to post-service service requirements. Through the above training process, in a customer service example scenario, the off-line conversation flow mining processing, key conversation mining processing, or off-line dialogue summary generation processing can be achieved.

For off-line conversation flow mining processing, in some embodiments of the present disclosure, because the semantic transfer relationships can be input to the conversation structure learning layer, based on this, the global flowchart corresponding to the conversation can be obtained. In the customer service scenario, the conversation is driven by standard operating procedures (SOPs), so how to split out each SOP from the global flowchart of the conversation to facilitate the understanding and modification of the SOP by the customer service provider is the main goal of the off-line conversation flow mining. In some embodiments of the present disclosure, a subsequence mining method based on frequent item statistics can be adopted to achieve the reconstruction of SOPs in the global flowchart of the conversation (i.e., conversation flow mining and reconstruction).

For the key conversation mining processing, which may also be referred to as off-line gold-medal script mining, after achieving conversation structuralization, scripts with the same semantics are associated to an identical discrete node. For the same customer questions, customer service agents can choose different semantic scripts to reply, but they often lead to different conversation goals. For example, in marketing scenarios, scripts of senior customer service agents often achieve better marketing results than new employees. Based on this, in some embodiments of the present disclosure, a method for locating marketing objection points and dissatisfaction nodes based on the causal discovery framework is adopted to shield highly relevant but non-causal agent scripts and mine script nodes with critical impact on service results to assist in improving the business objectives of customer service. For example, a causal map is constructed first (for example, the conversation being discretized through clustering to obtain nodes in the causal map, and the causal links between the nodes being mined through causal discovery to obtain edges in the causal map).

Then, based on the causal map, key factors in the conversation, including customer service script strategies, key customer objections, and weak points in customer service sparring training, are mined so as to determine script nodes that have key impact on the service result.

For the off-line dialogue summary generation processing, it is very time-consuming and labor-intensive to perform analysis and quality check of the massive amount of human-human conversation logs, and how to transcribe redundant customer service conversations into streamlined customer question representations and customer service solution representations is the main challenge faced by the customer service conversation summarization. Therefore, in some embodiments of the present disclosure, by adopting an unsupervised conversation summarization algorithm, the semantic similarity calculation capability of conversation representation learning is used in combination with syntactic analysis to realize redundant sentence rewriting and trunk extraction and finally form the dialogue summary.

With the above embodiments, a system for human-machine collaborative conversation interaction is used to meet different service requirements. Through the conversational pre-training layer, the structural information of the conversation data can be obtained. The structural information can effectively characterize the syntactic structural relationships within the statements corresponding to the conversation data and the syntactic dependencies among multiple statements. Accordingly, an accurate basis can be provided for more accurate understanding of the semantics of the conversation data in the future. Through the conversation representation learning layer, the semantic representation vectors of the conversation data in several different dimensions can be obtained. The semantic representation vectors in different dimensions are complementary and cross-referential to each other, thus further ensuring the comprehensiveness and correctness of the semantic understanding of the conversation data. The conversation structure learning layer can analyze the semantics of the conversation mainly from the perspective of conversation turns so as to obtain the semantic transfer relationships between different turns of conversation. Accordingly, each conversation statement can take other statements as semantic reference and, particularly in the presence of pronouns, ellipses, etc., more accurate semantic information can be obtained. The service layer, based on the results of other layers, including the semantic representation vector and the semantic transfer relationships of the conversation data, can more accurately determine the conversation data that meet the actual service requirements, so that these conversation data can be used for conducting corresponding service processing that can effectively meet the corresponding service requirements, such as conducting service training, or conducting conversation assistance, and so on. This system for human-machine collaborative conversation interaction can be used in a wide variety of working scenarios. For example, when applied to a conversation sample database for different services, it can determine data, from the conversation sample database, that meet the service requirements. For another example, when applied to a real-time human-machine interaction conversation process, it can assist in determining the conversation statements that more closely match the customer's current interaction statements, and so on. This shows that the system for human-machine collaborative conversation interaction, according to different working scenarios and based on various conversation data in the working scenarios, can ultimately implement the determination of conversation data meeting the service requirements and the service processing, and thus can meet various collaborative conversation interaction requirements in actual intelligent conversation bot working scenarios.

Figure 4:
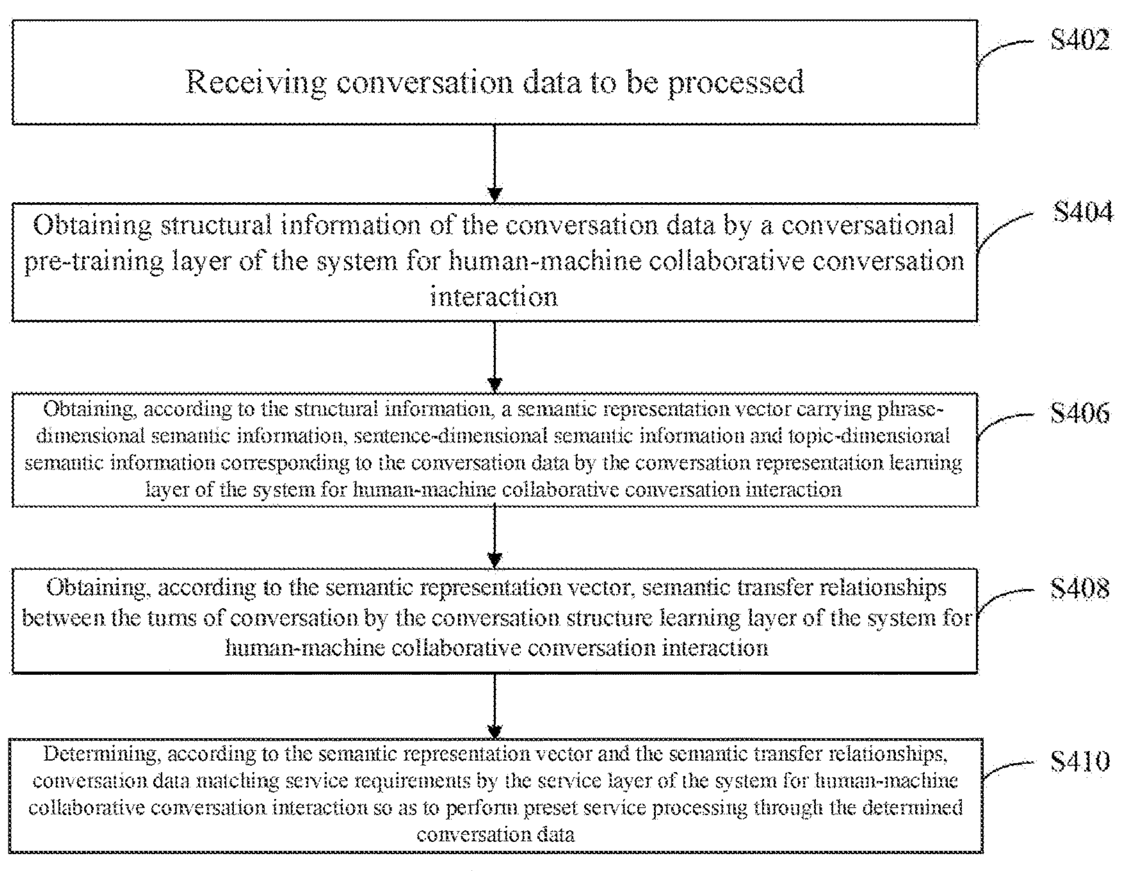
FIG. 4 is a flowchart of an example method for human-machine collaborative conversation interaction, according to some embodiments of the present disclosure.

Reference is made to FIG. 4, which illustrates a flowchart of a human-machine collaborative conversation interaction method, according to some embodiments of the present disclosure.

In the embodiments of FIG. 4, the method for human-machine collaborative conversation interaction is implemented using the system for human-machine collaborative conversation interaction in the above embodiments of FIGS. 2A, 2B, and 3. The method includes the following steps S402, S404, S406, S408, and S410.

In step S402, conversation data to be processed is received. Here, the conversation data includes multiple turns of conversation, which may be any conversation involving human-machine collaborative conversation interaction.

In step S404, structural information of the conversation data is obtained by a conversational pre-training layer of the system for human-machine collaborative conversation interaction.

In step S406: according to the structural information, a semantic representation vector carrying phrase-dimensional semantic information, sentence-dimensional semantic information and topic-dimensional semantic information corresponding to the conversation data is obtained by the conversation representation learning layer of the system for human-machine collaborative conversation interaction.

In step S408: according to the semantic representation vector, semantic transfer relationships between the turns of conversation is obtained by the conversation structure learning layer of the system for human-machine collaborative conversation interaction.

In step S410, according to the semantic representation vector and the semantic transfer relationships, conversation data matching service requirements is determined by the service layer of the system for human-machine collaborative conversation interaction so as to perform preset service processing through the determined conversation data.

The above steps are briefly described and, in the specific implementation thereof, can be specifically implemented with reference to the processing of the corresponding parts of the system for human-machine collaborative conversation interaction in the above embodiments of FIGS. 2A, 2B, and 3, and thus will not be repeated here for the sake of brevity.

According to the above embodiments, the system for human-machine collaborative conversation interaction, according to different working scenarios, can ultimately implement based on various conversation data in the different working scenarios determination of conversation data meeting the service requirements as well as service processing, and thus can meet various collaborative conversation interaction requirements in actual intelligent conversation bot working scenarios.

Figure 5:
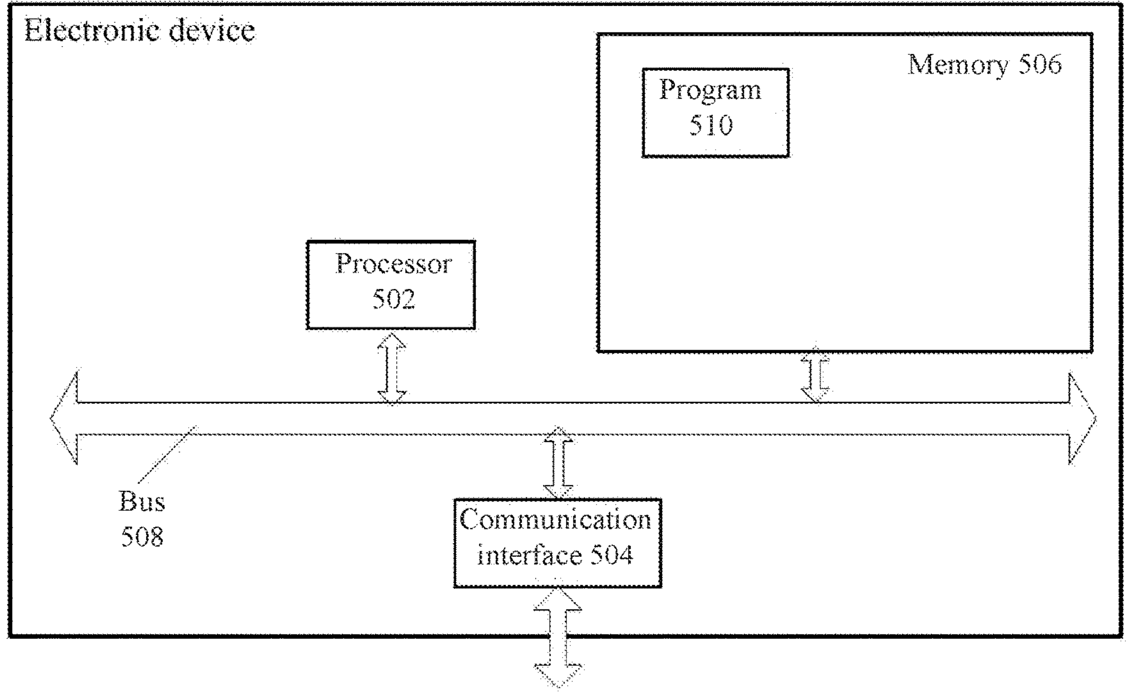
FIG. 5 is a schematic structural diagram of an example electronic device, according to some embodiments of the present disclosure.

Reference is made to FIG. 5, which illustrates a schematic structural diagram of an electronic device, according to some embodiments of the present disclosure. The specific embodiments of the present disclosure do not limit the specific implementation of the electronic device.

As shown in FIG. 5, the electronic device may include a processor 502, a communication interface 504, a memory 506, and a communications bus 508.

The processor 502, the communication interface 504, and the memory 506 carry out communication with one another via the communications bus 508.

The communication interface 504 is configured to communicate with other electronic devices or servers.

The processor 502 is configured to execute the program 510, and can specifically perform the relevant steps in the embodiments of the method for human-machine collaborative conversation interaction described above.

Specifically, the program 510 may include program code, which includes computer operating instructions.

The processor 502 may be a CPU, or an application specific integrated circuit (ASIC), or one or more integrated circuits configured to implement the embodiments of the present disclosure. One or more processors included in a smart device may be the same type of processor, such as one or more CPUs; or may be different types of processors, such as one or more CPUs and one or more ASICs.

The memory 506 is configured to store the system for human-machine collaborative conversation interaction and the program 510 described in the above embodiments of FIGS. 2A, 2B, and 3. The memory 506 may include a high-speed RAM memory and may also include a non-volatile memory, for example, at least one disk memory.

The program 510 may be used, in particular, to cause the processor 502 to perform operations corresponding to the method for human-machine collaborative conversation interaction described in the preceding method embodiments. That is, the processor 502 is caused to invoke the system for human-machine collaborative conversation interaction in the memory 506 according to the method for human-machine collaborative conversation interaction described in the preceding method embodiments to perform the corresponding human-machine collaborative conversation interaction operation.

The specific implementation of the steps in the program 510 can be found in the corresponding description of the corresponding steps and units in the method embodiments described above, and have the corresponding beneficial effects, and will not be repeated herein. It will be clear to those skilled in the field that, for the convenience and brevity of the description, for the specific working processes of the devices and modules described above, reference can be made to the corresponding process descriptions in the preceding method embodiments and will not be repeated here for the sake of brevity.

The embodiments of the present disclosure further provide a computer program product comprising computer instructions that instruct the computing device to perform the operations corresponding to the method for human-machine collaborative conversation interaction of the method embodiments described above. The embodiments of the present disclosure further provide a non-transitory computer-readable storage medium. The non-transitory computer-readable storage medium stores a set of instructions that are executable by one or more processors of a device to cause the device to perform the operations corresponding to the method for human-machine collaborative conversation interaction of the method embodiments described above.

It is noted that, depending on the needs of the implementation, the individual components/steps described in the embodiments of the present disclosure may be split into more components/steps, or two or more components/steps or part of the operations of the components/steps may be combined into a new component/step to achieve the purpose of the embodiments of the present disclosure.

The methods according to the embodiments of the present disclosure described above may be implemented in hardware or firmware, or be implemented as software or computer code that may be stored in a recording medium (such as a CD ROM, RAM, floppy disk, hard disk, or magnetic disk), or be implemented as computer code downloaded over a network that was originally stored in a remote recording medium or non-transitory computer-readable storage medium and will be stored in a local recording medium, such that the methods described herein may be processed by such software stored on a recording medium using a general-purpose computer, a special purpose processor, or programmable or dedicated hardware (such as an ASIC, NPU, FPGA, etc.). It can be understood that the computer, processor, microprocessor controller, or programmable hardware includes a storage component (e.g., RAM, ROM, flash memory, etc.) that can store or receive software or computer code, where the software or computer code, when accessed and executed by the computer, the processor, or the hardware, implements the methods described herein. Further, when a general purpose computer accesses the code used to implement the methods illustrated herein, the execution of the code converts the general purpose computer to a dedicated computer for performing the methods illustrated herein.

Those of ordinary skill in the art can realize that the units and method steps of the examples described in conjunction with the embodiments disclosed herein are capable of being implemented with electronic hardware, or a combination of computer software and electronic hardware. Whether these functions are performed in hardware or software depends on the specific application and design constraints of the technical solution. A skilled professional may use different methods to implement the described functions for each particular application, but such implementations should not be considered outside the scope of the embodiments of the present disclosure.

The embodiments may further be described using the following clauses:

1. A system for human-machine collaborative conversation interaction, comprising:
   - one or more processors configured to execute instructions to cause the system to perform operations comprising:
   - outputting, according to conversation data to be processed, structural information of the conversation data, wherein the conversation data comprises multiple turns of conversation;
   - obtaining, according to the structural information, a semantic representation vector carrying phrase-dimensional semantic information, sentence-dimensional semantic information and topic-dimensional semantic information corresponding to the conversation data;
   - obtaining semantic transfer relationships between each turn of conversation according to the semantic representation vector; and
   - determining, according to the semantic representation vector and the semantic transfer relationships, conversation data matching service requirements so as to perform preset service processing through the determined conversation data.

2. The system of clause 1, wherein the operation of outputting, according to the conversation data to be processed, further comprises outputting, according to conversion data to be processed, structural information of an intra-sentence token structure of each turn of conversation and structural information of conversation dependencies of the multiple turns of conversation in the conversation data.

3. The system of clause 1 or clause 2, wherein the operations further comprising: determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

4. The system of any of clauses 1-3, wherein the system for human-machine collaborative conversation interaction is obtained through training using operations comprising:

training a pre-trained language model with respect to a conversation structure based on conversation data samples of a set service to obtain a pre-trained language model capable of outputting structural information carrying the conversation data samples, wherein the conversation data samples comprise data samples of multiple turns of conversation;

according to a representation vector output by the trained pre-trained language model, performing phrase representation training, sentence vector representation training, and topic representation training for the conversation data samples by a machine learning model to obtain a machine learning model capable of inputting a representation vector carrying corresponding phrase-dimensional semantic information, sentence-dimensional semantic information, and topic-dimensional semantic information;

according to the representation vector output by the trained machine learning model, performing training of performing semantic analysis for the multiple turns of conversation to obtain the semantic transfer relationships between the turns of conversation; and performing training of determining the conversation data matching service requirements of the set service according to the semantic representation vector and the semantic transfer relationships, so as to perform the preset service processing through the determined conversation data.

5. The system of clause 4, wherein the operation of training of the pre-trained language model with respect to the conversation structure comprises:

training for an intra-sentence token structure in the conversation data samples, and training for conversation dependencies between the multiple turns of conversation in the conversation data samples.

6. The system of clause 5, wherein training for the intra-sentence token structure in the conversation data samples comprises:

performing token feature extraction on a first sub-machine learning model using tokens corresponding to the conversation data samples as an input to the first sub-machine learning model to obtain a first sub-representation vector;

performing syntactic structure feature extraction on a second sub-machine learning model using part-of-speech information of tokens corresponding to the conversation data samples and a syntactic dependency tree obtained by syntactic analysis of the conversation data samples based on the tokens as an input to the second sub-machine learning model, so as to obtain a second sub-representation vector; and concatenating the first sub-representation vector and the second sub-representation vector to obtain a token structure representation vector carrying information of the intra-sentence token structure of the conversation data samples.

7. The system of clause 5 or clause 6, wherein training for the conversation dependencies between the multiple turns of conversation in the conversation data samples comprises: training, by a third sub-machine learning model based on semantic similarities between sample features of the data samples of the turns of conversation, to obtain a conversation structure representation vector characterizing dependencies between the turns of conversation.

8. The system of clause 7, wherein training, by the third sub-machine learning model based on the semantic similarities between the sample features of the data samples of the turns of conversation, to obtain the conversation structure representation vector characterizing the dependencies between the turns of conversation comprises:

masking tokens in data samples of a part of the turns of conversation among the data samples of the multiple turns of conversation to obtain data samples of the multiple turns of conversation containing masked data; and determining, by the third sub-machine learning model, semantic similarities between sample features of the data samples of the turns of conversation based on the data samples of the multiple turns of conversation containing the masked data, and training to obtain the conversation structure representation vector characterizing the dependencies between the turns of conversation.

9. The system of any of clauses 4-8, wherein performing the phrase representation training for the conversation data samples by the machine learning model comprises:

performing word segmentation processing on the conversation data samples to obtain multiple segmented words; and performing the phrase representation training of the machine learning model with respect to the conversation data samples, according to the cohesion and degree of freedom of the multiple segmented words, the representation vector obtained through the pre-trained language model, and a preset contrastive learning loss function.

10. The system of any of clauses 4-9, wherein performing the sentence vector representation training for the conversation data samples by the machine learning model comprises:

determining, from the conversation data samples, conversation sample data to be processed, and forming conversation sample data pairs;

obtaining, based on the pre-trained language model, representation vector pairs corresponding to the conversation sample data pairs; and performing mutual representation processing of the representation vector pairs by the machine learning model, and performing the sentence vector representation training for the conversation data samples based on the result of the mutual representation processing.

11. The system of any of clauses 4-10, wherein the pre-trained language model comprises a first sub pre-trained model and a second sub pre-trained model;

wherein the first sub pre-trained model is configured to perform training for the conversation structure according to token information corresponding to data samples of each turn of conversation; and the second sub pre-trained model is configured to perform training for the conversation structure according to turn information, role information, token information, and token position information corresponding to data samples of each turn of conversation; and wherein the performing, according to the representation vector output by the trained pre-trained language model, topic representation training for the conversation data samples by the machine learning model comprises:

performing the topic representation training for the conversation data samples by the machine learning model according to a representation vector output by the trained second sub pre-trained model.

12. The system of any of clauses 4-11, wherein:

the operation of performing training comprises:

performing discretization processing of the representation vector output by the trained machine learning model; and performing semantic analysis for the multiple turns of conversation according to the result of the discretization processing to obtain the semantic transfer relationships between the turns of conversation; or the operation of performing training comprises:

performing auto-encoding processing based on the representation vector output by the trained machine learning model; and performing conversation task modeling according to the result of the auto-encoding processing and obtaining the semantic transfer relationships between the turns of conversation according to the result of the modeling.

13. The system of any of clauses 4-12, wherein:

the operation of performing training comprises:

determining, according to the semantic representation vector and the semantic transfer relationships, conversation data for performing service training; and generating simulated conversation test questions according to the determined conversation data and user profile data, and performing the service training through the simulated conversation test questions; or the operation of performing training comprises:

determining, according to the semantic representation vector and the semantic transfer relationships, conversation data for assisting services;

performing, based on the determined conversation data, at least one of streaming intention recognition processing, conversation context-based service response screening processing, or preset goal-based guided conversation screening processing; and performing service processing according to the result of the processing; or the operation of performing training comprises:

acquiring conversation data during service processing and performing at least one of conversation flow mining processing, key conversation mining processing, or dialogue summary generation processing on the acquired conversation data.

14. A method for human-machine collaborative conversation interaction applied to a human-machine collaborative conversation interaction system, the method comprising:

receiving conversation data to be processed, wherein the conversation data comprises multiple turns of conversation;

obtaining structural information of the conversation data;

according to the structural information, obtaining a semantic representation vector carrying phrase-dimensional semantic information, sentence-dimensional semantic information and topic-dimensional semantic information corresponding to the conversation data;

according to the semantic representation vector, obtaining semantic transfer relationships between each turn of conversation; and according to the semantic representation vector and the semantic transfer relationships, determining conversation data matching service requirements so as to perform preset service processing through the determined conversation data.

15. The method of clause 14, further comprising:

outputting, according to the conversation data to be processed, structural information of an intra-sentence token structure of each turn of conversation and structural information of conversation dependencies of the multiple turns of conversation in the conversation data.

16. The method of clause 14 or clause 15, further comprising:

determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

17. The method of any of clauses 14-16, further comprising:

training a pre-trained language model with respect to a conversation structure based on conversation data samples of a set service to obtain a pre-trained language model capable of outputting structural information carrying the conversation data samples, wherein the conversation data samples comprise data samples of multiple turns of conversation;

according to a representation vector output by the trained pre-trained language model, performing phrase representation training, sentence vector representation training, and topic representation training for the conversation data samples by a machine learning model to obtain a machine learning model capable of inputting a representation vector carrying corresponding phrase-dimensional semantic information, sentence-dimensional semantic information, and topic-dimensional semantic information;

according to the representation vector output by the trained machine learning model, performing training of performing semantic analysis for the multiple turns of conversation to obtain the semantic transfer relationships between the turns of conversation; and performing training of determining the conversation data matching service requirements of the set service according to the semantic representation vector and the semantic transfer relationships, so as to perform the preset service processing through the determined conversation data.

18. A non-transitory computer-readable storage medium storing a set of instructions that are executable by one or more processors of a device to cause the device to perform:

receiving conversation data to be processed, wherein the conversation data comprises multiple turns of conversation;

obtaining structural information of the conversation data;

according to the structural information, obtaining a semantic representation vector carrying phrase-dimensional semantic information, sentence-dimensional semantic information and topic-dimensional semantic information corresponding to the conversation data;

according to the semantic representation vector, obtaining semantic transfer relationships between each turn of conversation; and according to the semantic representation vector and the semantic transfer relationships, determining conversation data matching service requirements so as to perform preset service processing through the determined conversation data.

19. The non-transitory computer-readable storage medium of clause 18, wherein the set of instructions are executable by the one or more processors of the device to cause the device to further perform:

outputting, according to the conversation data to be processed, structural information of an intra-sentence token structure of each turn of conversation and structural information of conversation dependencies of the multiple turns of conversation in the conversation data.

20. The non-transitory computer-readable storage medium of clause 18 or clause 19, the set of instructions are executable by the one or more processors of the device to cause the device to further perform:

determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

The above implementation is only for the purpose of illustrating the embodiments of the present disclosure, and is not a limitation of the embodiments of the present disclosure. A person of ordinary skill in the art concerned may make various variations and variants without departing from the spirit and scope of the embodiments of the present disclosure, so that all equivalent technical solutions also fall within the scope of the embodiments of the present disclosure, and the scope of patent protection of the embodiments of the present disclosure shall be limited by the claims.

The invention claimed is:

1. A system for human-machine collaborative conversation interaction, comprising:

one or more processors configured to execute instructions to cause the system to perform operations comprising:

outputting, according to conversation data to be processed, structural information of the conversation data, wherein the conversation data comprises multiple turns of conversation;

obtaining, according to the structural information, a semantic representation vector carrying phrase-dimensional semantic information, sentence-dimensional semantic information and topic-dimensional semantic information corresponding to the conversation data;

obtaining semantic transfer relationships between each turn of conversation according to the semantic representation vector; and determining, according to the semantic representation vector and the semantic transfer relationships, conversation data matching service requirements so as to perform preset service processing through the determined conversation data, wherein the system for human-machine collaborative conversation interaction is obtained through training using operations comprising:

training a pre-trained language model with respect to a conversation structure based on the conversation data samples of a set service to obtain a pre-trained language model capable of outputting structural information carrying the conversation data samples, wherein the conversation data samples comprise data samples of multiple turns of conversation;

according to a representation vector output by the trained pre-trained language model, performing phrase representation training, sentence vector representation training, and topic representation training for the conversation data samples by a machine learning model to obtain a machine learning model capable of outputting a representation vector carrying corresponding phrase-dimensional semantic information, sentence-dimensional semantic information, and topic-dimensional semantic information;

according to the representation vector output by the trained machine learning model, performing training of performing semantic analysis for the multiple turns of conversation to obtain the semantic transfer relationships between the turns of conversation; and performing training of determining the conversation data matching service requirements of the set service according to the semantic representation vector and the semantic transfer relationships, so as to perform the preset service processing through the determined conversation data, wherein performing the sentence vector representation training for the conversation data samples by the machine learning model comprises:

determining, from the conversation data samples, conversation sample data to be processed, and forming conversation sample data pairs;

obtaining, based on the pre-trained language model, representation vector pairs corresponding to the conversation sample data pairs; and performing mutual representation processing of the representation vector pairs by the machine learning model, and performing the sentence vector representation training for the conversation data samples based on the result of the mutual representation processing.

2. The system of claim 1, wherein the operation of outputting, according to the conversation data to be processed, further comprises outputting, according to conversion data to be processed, structural information of an intra-sentence token structure of each turn of conversation and structural information of conversation dependencies of the multiple turns of conversation in the conversation data.

3. The system of claim 1, wherein the operations further comprising:

determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

4. The system of claim 1, wherein the operation of training of the pre-trained language model with respect to the conversation structure comprises:

training for an intra-sentence token structure in the conversation data samples, and training for conversation dependencies between the multiple turns of conversation in the conversation data samples.

5. The system of claim 4, wherein training for the intra-sentence token structure in the conversation data samples comprises:

performing token feature extraction using a first sub-machine learning model using tokens corresponding to the conversation data samples as an input to the first sub-machine learning model to obtain a first sub-representation vector;

performing syntactic structure feature extraction using a second sub-machine learning model using part-of-speech information of tokens corresponding to the conversation data samples and a syntactic dependency tree obtained by syntactic analysis of the conversation data samples based on the tokens as an input to the second sub-machine learning model, so as to obtain a second sub-representation vector; and concatenating the first sub-representation vector and the second sub-representation vector to obtain a token structure representation vector carrying information of the intra-sentence token structure of the conversation data samples.

6. The system of claim 4, wherein training for the conversation dependencies between the multiple turns of conversation in the conversation data samples comprises:

training, by a third sub-machine learning model based on semantic similarities between sample features of the data samples of the turns of conversation, to obtain a conversation structure representation vector characterizing dependencies between the turns of conversation.

7. The system of claim 6, wherein training, by the third sub-machine learning model based on the semantic similarities between the sample features of the data samples of the turns of conversation, to obtain the conversation structure representation vector characterizing the dependencies between the turns of conversation comprises:

masking tokens in data samples of a part of the turns of conversation among the data samples of the multiple turns of conversation to obtain data samples of the multiple turns of conversation containing masked data; and determining, by the third sub-machine learning model, semantic similarities between sample features of the data samples of the turns of conversation based on the data samples of the multiple turns of conversation containing the masked data, and training to obtain the conversation structure representation vector characterizing the dependencies between the turns of conversation.

8. The system of claim 1, wherein performing the phrase representation training for the conversation data samples by the machine learning model comprises:

performing word segmentation processing on the conversation data samples to obtain multiple segmented words; and performing the phrase representation training of the machine learning model with respect to the conversation data samples, according to the cohesion and degree of freedom of the multiple segmented words, the representation vector obtained through the pre-trained language model, and a preset contrastive learning loss function.

9. The system of claim 1, wherein the pre-trained language model comprises a first sub pre-trained model and a second sub pre-trained model;

wherein the first sub pre-trained model is configured to perform training for the conversation structure according to token information corresponding to data samples of each turn of conversation; and the second sub pre-trained model is configured to perform training for the conversation structure according to turn information, role information, token information, and token position information corresponding to data samples of each turn of conversation; and wherein the performing, according to the representation vector output by the trained pre-trained language model, topic representation training for the conversation data samples by the machine learning model comprises:

performing the topic representation training for the conversation data samples by the machine learning model according to a representation vector output by the trained second sub pre-trained model.

10. The system of claim 1, wherein:

the operation of performing training comprises:

performing discretization processing of the representation vector output by the trained machine learning model; and performing semantic analysis for the multiple turns of conversation according to the result of the discretization processing to obtain the semantic transfer relationships between the turns of conversation; or the operation of performing training comprises:

performing auto-encoding processing based on the representation vector output by the trained machine learning model; and performing conversation task modeling according to the result of the auto-encoding processing and obtaining the semantic transfer relationships between the turns of conversation according to the result of the modeling.

11. The system of claim 1, wherein:

the operation of performing training comprises:

determining, according to the semantic representation vector and the semantic transfer relationships, conversation data for performing service training; and generating simulated conversation test questions according to the determined conversation data and user profile data, and performing the service training through the simulated conversation test questions; or the operation of performing training comprises:

determining, according to the semantic representation vector and the semantic transfer relationships, conversation data for assisting services;

performing, based on the determined conversation data, at least one of streaming intention recognition processing, conversation context-based service response screening processing, or preset goal-based guided conversation screening processing; and performing service processing according to the result of the processing; or the operation of performing training comprises:

acquiring conversation data during service processing and performing at least one of conversation flow mining processing, key conversation mining processing, or dialogue summary generation processing on the acquired conversation data.

12. A method for human-machine collaborative conversation interaction applied to a human-machine collaborative conversation interaction system, the method comprising:

receiving conversation data to be processed, wherein the conversation data comprises multiple turns of conversation;

obtaining structural information of the conversation data;

according to the structural information, obtaining a semantic representation vector carrying phrase-dimensional semantic information, sentence-dimensional semantic information and topic-dimensional semantic information corresponding to the conversation data;

according to the semantic representation vector, obtaining semantic transfer relationships between each turn of conversation; and according to the semantic representation vector and the semantic transfer relationships, determining conversation data matching service requirements so as to perform preset service processing through the determined conversation data;

wherein the human-machine collaborative conversation interaction system is obtained through training using operations comprising:

training a pre-trained language model with respect to a conversation structure based on the conversation data samples of a set service to obtain a pre-trained language model capable of outputting structural information carrying the conversation data samples, wherein the conversation data samples comprise data samples of multiple turns of conversation;

according to a representation vector output by the trained pre-trained language model, performing phrase representation training, sentence vector representation training, and topic representation training for the conversation data samples by a machine learning model to obtain a machine learning model capable of outputting a representation vector carrying corresponding phrase-dimensional semantic information, sentence-dimensional semantic information, and topic-dimensional semantic information;

according to the representation vector output by the trained machine learning model, performing training of performing semantic analysis for the multiple turns of conversation to obtain the semantic transfer relationships between the turns of conversation; and performing training of determining the conversation data matching service requirements of the set service according to the semantic representation vector and the semantic transfer relationships, so as to perform the preset service processing through the determined conversation data, wherein performing the sentence vector representation training for the conversation data samples by the machine learning model comprises:

determining, from the conversation data samples, conversation sample data to be processed, and forming conversation sample data pairs;

obtaining, based on the pre-trained language model, representation vector pairs corresponding to the conversation sample data pairs; and performing mutual representation processing of the representation vector pairs by the machine learning model, and performing the sentence vector representation training for the conversation data samples based on the result of the mutual representation processing.

13. The method of claim 12, further comprising:

outputting, according to the conversation data to be processed, structural information of an intra-sentence token structure of each turn of conversation and structural information of conversation dependencies of the multiple turns of conversation in the conversation data.

14. The method of claim 12, further comprising:

determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

15. A non-transitory computer-readable storage medium storing a set of instructions that are executable by one or more processors of a device to cause the device to perform:

receiving conversation data to be processed, wherein the conversation data comprises multiple turns of conversation;

obtaining structural information of the conversation data;

according to the structural information, obtaining a semantic representation vector carrying phrase-dimensional semantic information, sentence-dimensional semantic information and topic-dimensional semantic information corresponding to the conversation data;

according to the semantic representation vector, obtaining semantic transfer relationships between each turn of conversation; and according to the semantic representation vector and the semantic transfer relationships, determining conversation data matching service requirements so as to perform preset service processing through the determined conversation data;

wherein the structural information of the conversation data is outputted by a pre-trained language model trained with respect to a conversation structure based on conversation data samples of a set service, the conversation data samples comprise data samples of multiple turns of conversation;

wherein according to a representation vector output by the trained pre-trained language model, phrase representation training, sentence vector representation training, and topic representation training for the conversation data samples are performed by a machine learning model to obtain a machine learning model capable of outputting a representation vector carrying corresponding phrase-dimensional semantic information, sentence-dimensional semantic information, and topic-dimensional semantic information;

according to the representation vector output by the trained machine learning model, training of performing semantic analysis for the multiple turns of conversation is performed to obtain the semantic transfer relationships between the turns of conversation; and training of determining the conversation data matching service requirements of the set service is performed according to the semantic representation vector and the semantic transfer relationships, so as to perform the preset service processing through the determined conversation data, wherein the sentence vector representation training for the conversation data samples is performed by the machine learning model by:

determining, from the conversation data samples, conversation sample data to be processed, and forming conversation sample data pairs;

obtaining, based on the pre-trained language model, representation vector pairs corresponding to the conversation sample data pairs; and performing mutual representation processing of the representation vector pairs by the machine learning model, and performing the sentence vector representation training for the conversation data samples based on the result of the mutual representation processing.

16. The non-transitory computer-readable storage medium of claim 15, wherein the set of instructions are executable by the one or more processors of the device to cause the device to further perform:

outputting, according to the conversation data to be processed, structural information of an intra-sentence token structure of each turn of conversation and structural information of conversation dependencies of the multiple turns of conversation in the conversation data.

17. The non-transitory computer-readable storage medium of claim 15, the set of instructions are executable by the one or more processors of the device to cause the device to further perform:

determining, according to the semantic representation vector and the semantic transfer relationships, conversation data for performing service training, and generate simulated conversation test questions according to the determined conversation data and user profile data; or determining, according to the semantic representation vector and the semantic transfer relationships, conversation data for assisting services, and perform, based on the determined conversation data, at least one of streaming intention recognition processing, conversation context-based service response screening processing, or preset goal-based guided conversation screening processing; or acquiring conversation data during service processing and perform at least one of conversation flow mining processing, key conversation mining processing, or dialogue summary generation processing on the acquired conversation data.

* * * * *